United States Patent [19]

Roberts et al.

[11] 4,453,626
[45] Jun. 12, 1984

[54] VIBRATORY FEEDING APPARATUS

[75] Inventors: William J. Roberts, Terryville; Robert J. Ensminger, Winchester, both of Conn.

[73] Assignee: The Arthur G. Russell Company, Incorporated, Bristol, Conn.

[21] Appl. No.: 481,800

[22] Filed: Apr. 8, 1983

Related U.S. Application Data

[63] Continuation of Ser. No. 220,366, Dec. 29, 1980, abandoned.

[51] Int. Cl.³ ............................................. B65G 47/24
[52] U.S. Cl. ...................................... 198/391; 198/392
[58] Field of Search ............... 198/391, 392, 396, 635, 198/637

[56] References Cited

U.S. PATENT DOCUMENTS

| | | | |
|---|---|---|---|
| 2,949,998 | 8/1960 | Whitecar | 198/396 |
| 3,330,403 | 2/1967 | Roberts | 198/392 |
| 3,578,142 | 5/1971 | Burgess | 198/391 |
| 3,726,385 | 4/1973 | Sterling | 198/392 |
| 3,826,405 | 7/1974 | Hoppman | 198/392 |
| 4,245,733 | 1/1981 | Kubota | 198/391 |

Primary Examiner—John J. Love
Assistant Examiner—Paul A. Sobel
Attorney, Agent, or Firm—McCormick, Paulding & Huber

[57] ABSTRACT

An apparatus for orienting and feeding axially elongated articles has a feeder bowl which includes a helical ramp surface which terminates at the upper edge of the bowl. An annular ring supported for rotation around an upper portion of the feeder bowl has an upwardly facing article supporting surface contiguous with a terminal portion of the ramp surface to receive articles therefrom. An annular baffle disposed above the ring and in coaxial alignment with it coacts with the ring to successively release articles from the ring to a guide conveyor which directs the articles tangentially away from the ring. Separate independent drive mechanisms are provided for vibrating the feeder bowl and rotating the ring to enable the feeder bowl to operate intermittently to discharge articles onto the ring which may operate continuously.

12 Claims, 8 Drawing Figures

VIBRATORY FEEDING APPARATUS

This is a continuation of application Ser. No. 220,366, filed Dec. 29, 1980 now abandoned.

BACKGROUND OF THE INVENTION

This invention relates in general to article feeding devices and deals more particularly with an improved article feeder of the vibratory bowl type wherein the bowl is formed with a helical ramp along which articles to be fed travel in response to vibration or oscillation of the bowl. The present invention is particularly concerned with an improved vibratory feeding apparatus for orienting and feeding axially elongated articles in axially side-by-side relation to each other wherein each of the articles has an elongated body and a radially enlarged portion axially spaced from at least one end of the body.

Apparatus of the aforedescribed general type has heretofore been provided wherein a supply of articles loosely contained within a vibrating feeder bowl are discharged upwardly by means of a peripheral ramp leading to a gated outer rim through which articles are successively discharged in a generally radial direction. If articles are to be fed from the feeder bowl directly to another machine which operates continuously or to a conveyor which feeds the machine, the feeder bowl must generally remain in constant operation to continuously advance articles along its ramp surface. Articles loosely received within the central portion of the bowl remain in a continuous state of motion and constantly rub or impact against each other. This condition is generally undesirable, particularly where the articles are made from a soft plastic material or the like and have a surface finish which may be easily damaged. The present invention is particularly concerned with this problem.

It is the general aim of the present invention to provide an improved article feeding apparatus of the vibratory bowl type for feeding a continuous supply of axially elongated articles oriented in axially side-by-side relation and wherein the drive mechanism for vibrating the feeder bowl may, if desired, be intermittently operated.

SUMMARY OF THE INVENTION

In accordance with the present invention an apparatus is provided for orienting and feeding axially elongated articles, wherein each article has an axially elongated body and a radially enlarged portion axially spaced from at least one end of the body. The feeding apparatus comprises a feeder bowl for containing a supply of articles to be oriented and fed. A generally helical track surface extends along the inner periphery of the feeder bowl and has a terminal portion which extends along an associated portion of the upper edge of the bowl. A drive mechanism is provided for vibrating the feeder bowl to move articles contained within a central portion of the bowl onto and along the track surface in one direction and in generally axial end-to-end relation to each other. A ring surrounds a portion of the outer periphery of the feeder bowl and has an upwardly facing article supporting surface contiguous with the terminal portion of the track surface for receiving articles from the terminal portion. The ring is supported for rotation around and relative to the feeder bowl. The apparatus further includes drive means for rotating the ring, means for retaining articles on the supporting surface, and means for releasing each successive article from the supporting surface.

DETAILED DESCRIPTION OF PREFERRED EMBODIMENT

Figures 1, 2:
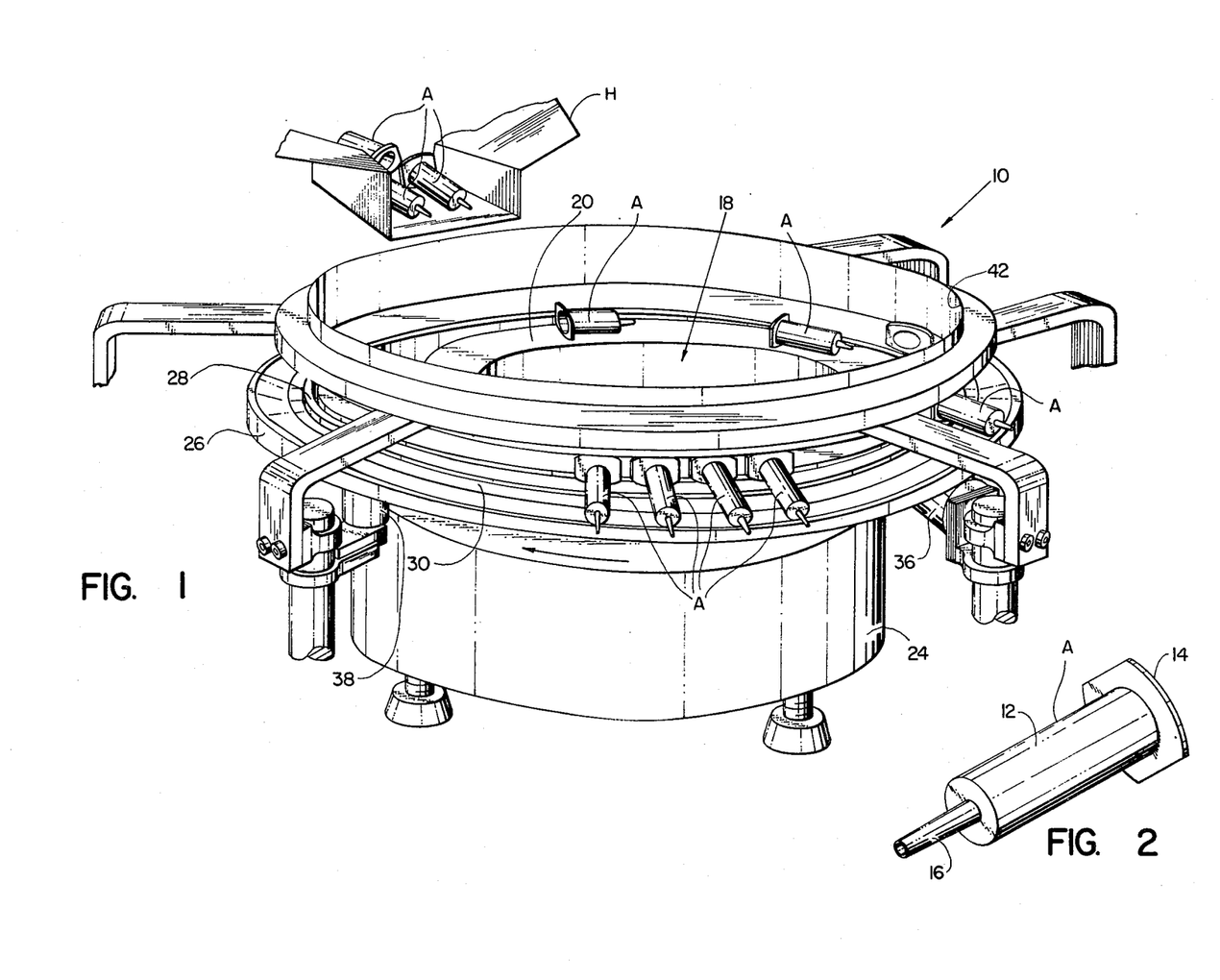
FIG. 1 is a perspective view of a vibratory feeder embodying the present invention and containing articles to be fed.
FIG. 2 is a somewhat enlarged perspective view of an article such as shown in FIG. 1.

Turning now to the drawings and referring first particularly to FIG. 1, a vibratory feeding apparatus embodying the present invention is indicated generally by the reference numeral 10. The apparatus 10 is particularly adapted for orienting and feeding a continuous succession of axially elongated articles, such as the articles indicated at A, A in the drawings. Each article has an axially elongated body and a radially enlarged portion axially spaced from at least one end of the body.

A typical article A is illustrated in somewhat further detail in FIG. 2 and comprises a hollow axially elongated generally cylindrical hypodermic syringe body part. The syringe body part A is preferably made from transparent plastic material and has a generally cylindrical body portion 12 and a radially enlarged flange portion 14 integrally connected to one end of the body portion. An axially elongated nozzle portion 16 projects coaxially from the opposite end of the body portion 12.

Considering now the illustrated vibratory feeding apparatus 10 in further detail, it includes a feeder bowl indicated generally at 18 which has a central portion for containing a supply of articles, such as the articles A, A. The feeder bowl 18 is preferably made from cast aluminum or like material and has a helical track surface 20 which spirals upwardly and outwardly from the central portion along the inner peripheral surface of the bowl. The track surface 20 is inclined radially outwardly and downwardly relative to the axis of the bowl 18, is wide enough to accommodate a single article A, and terminates in an arcuate terminal portion 22 at the circular upper edge of the bowl 18 as best shown in FIG. 3.

Figure 8:
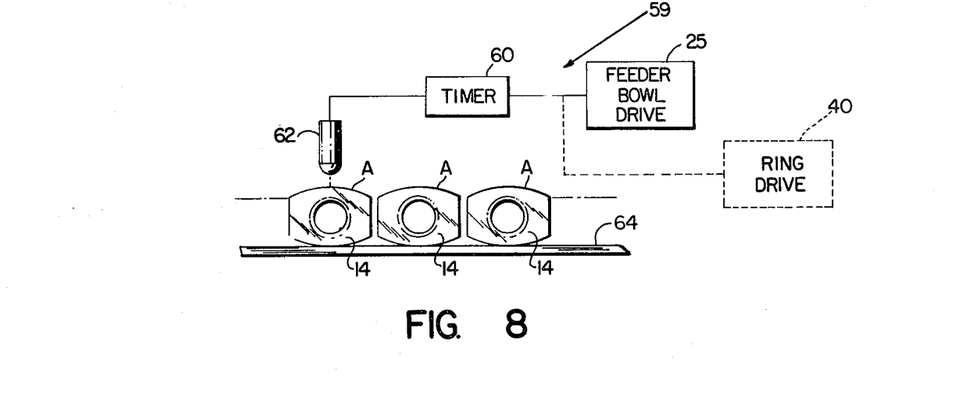
FIG. 8 is a schematic diagram showing components of a drive control mechanism.

The feeder bowl 18 is mounted on a base 24 which is supported on vertically adjustable legs and contains vibratory drive mechanism of a well-known type indicated schematically at 25 in FIG. 8, but not shown in detail. The drive mechanism 25 vibrates the feeder bowl 18 to move articles such as the articles A, A onto and along the track surface 20 in generally axial end-to-end relation to each other. The construction and arrangement of the drive mechanism 25 may vary, but, preferably, the latter mechanism is arranged to impart helical oscillatory motion to the feeder bowl 18. More specifically, the bowl drive mechanism is arranged to oscillate the bowl about its vertical axis and at the same time reciprocate it vertically. Preferably, the drive mechanism 25 includes a tuning device which may be adjusted to cause the feeder bowl to vibrate at a predetermined frequency, as, for example, 60 Hertz. Disclosure of a typical drive mechanism for vibrating a feeder bowl of the aforedescribed general type is contained in U.S. Pat. No. 3,048,260 to Willis for VIBRATOR FOR MATERIAL CONVEYING APPARATUS, issued Aug. 7, 1962. The aforesaid patent, which is assigned to the assignee of the present invention, is hereby adopted by reference as a part of the present disclosure.

Figure 3:
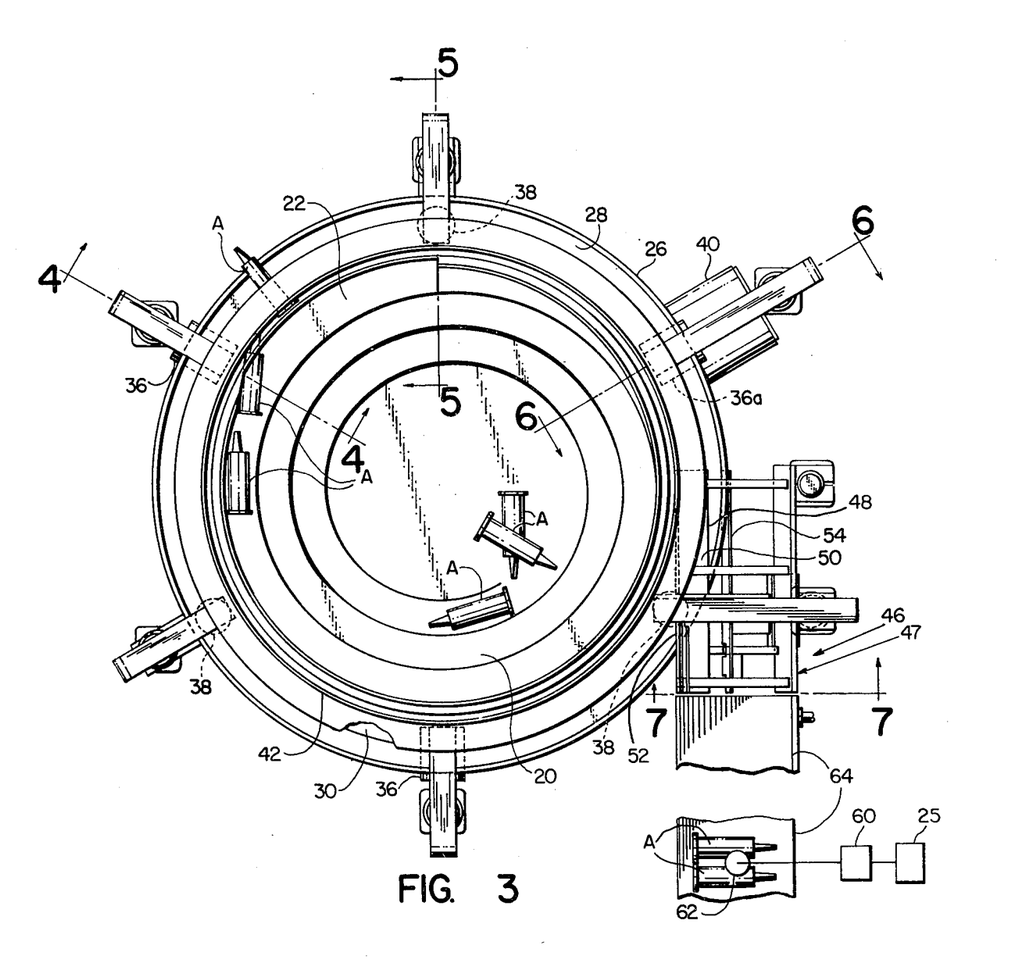
FIG. 3 is a plan view of the vibratory feeder shown in FIG. 1.
Figure 4:
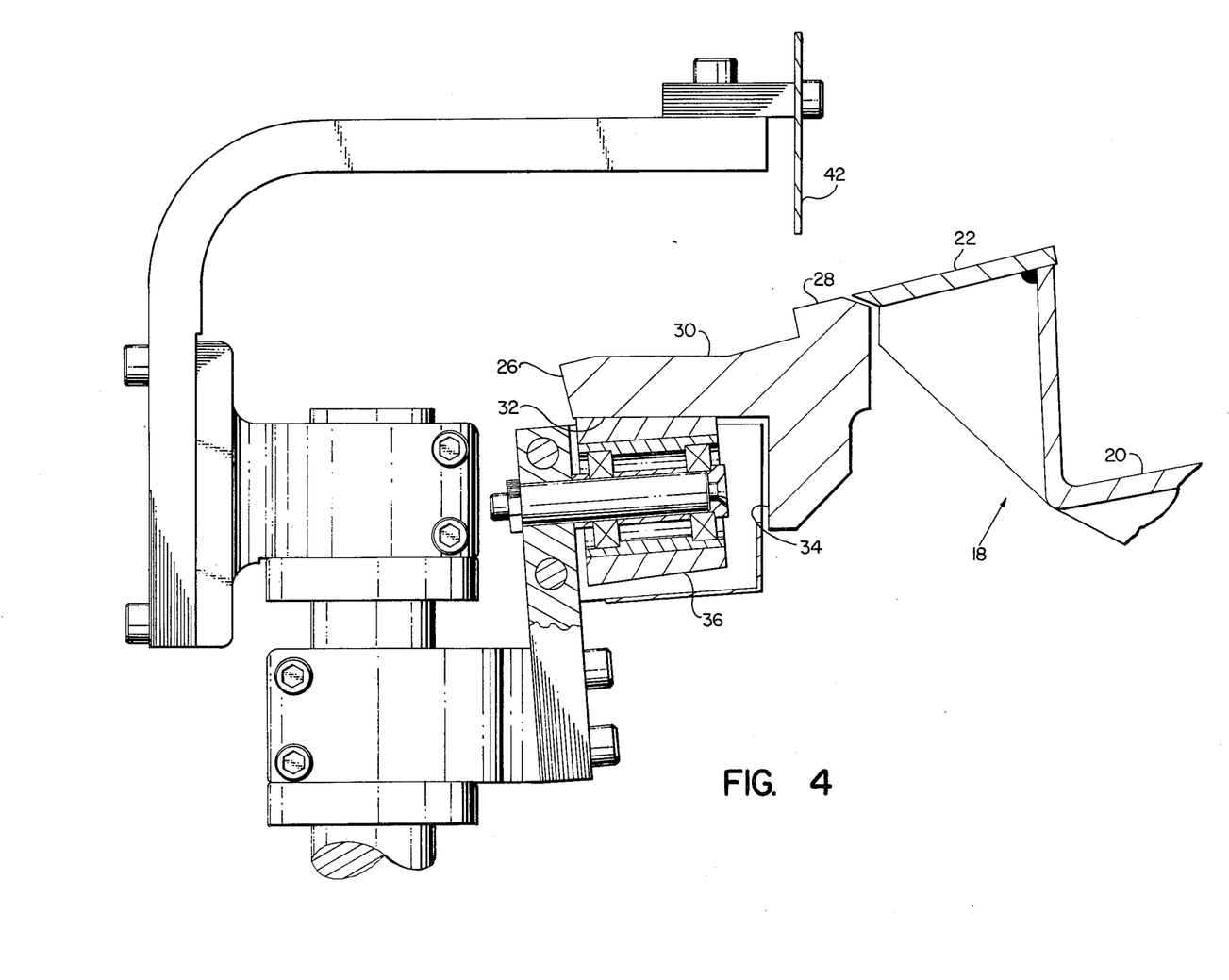
FIG. 4 is a somewhat enlarged fragmentary sectional view taken along the line 4—4 of FIG. 3.
Figure 5:
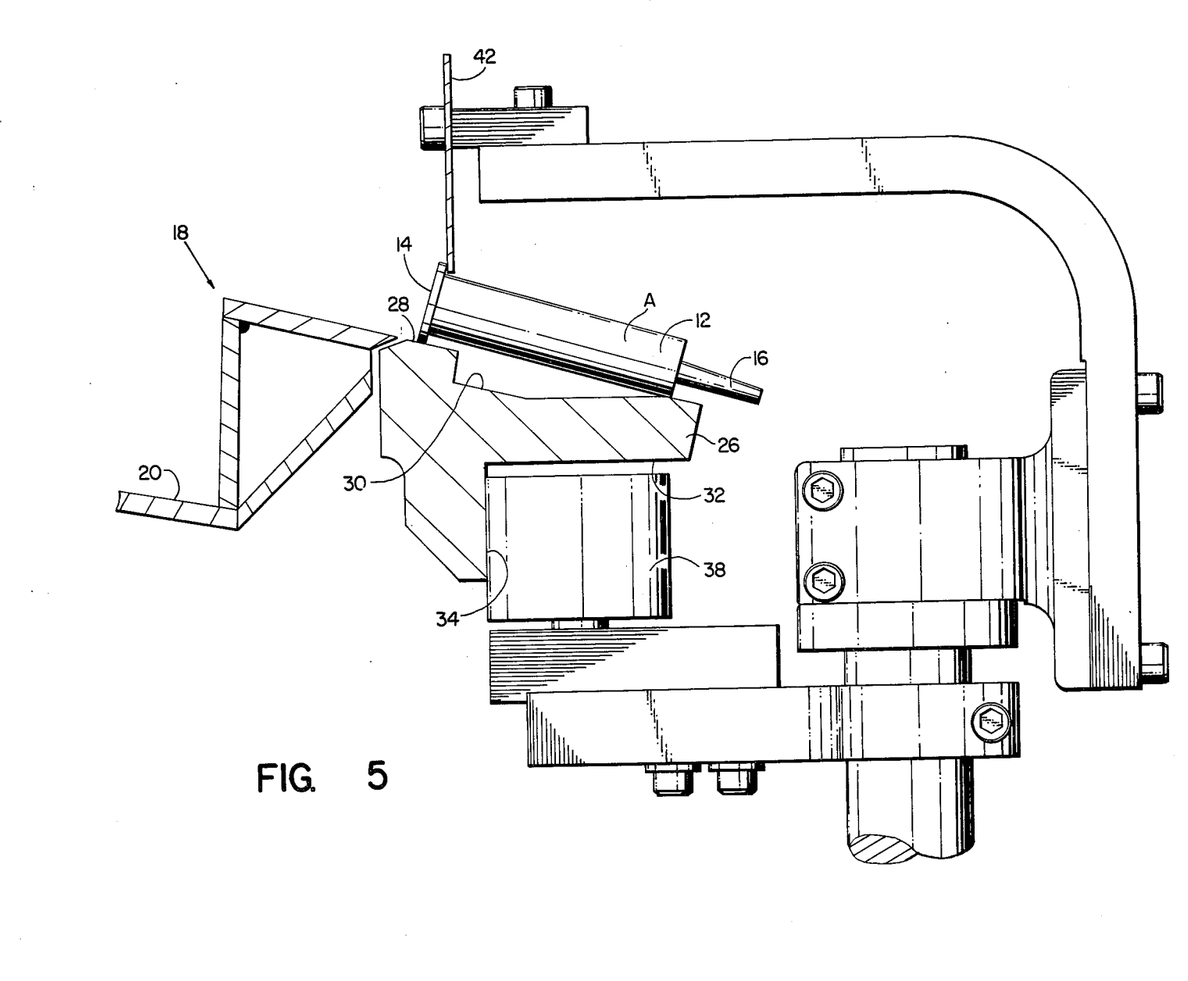
FIG. 5 is a somewhat enlarged fragmentary sectional view taken along the line 5—5 of FIG. 3.
Figure 6:
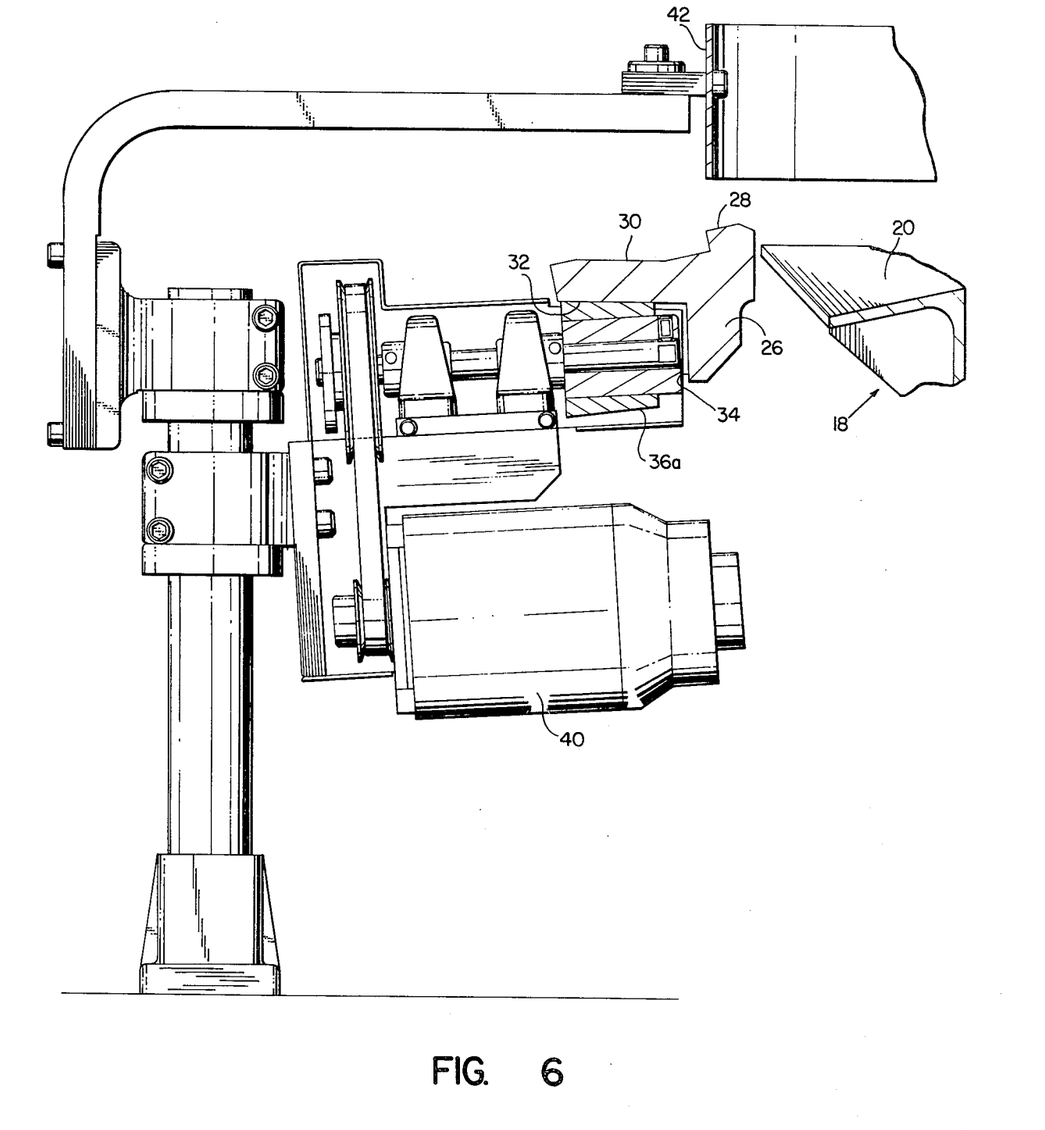
FIG. 6 is a somewhat enlarged fragmentary sectional view taken along the line 6—6 of FIG. 3.

An annular ring, indicated generally at 26, and best shown in FIGS. 1 and 3, surrounds an upper portion of the outer periphery of the feeder bowl 18 and has an upwardly facing article supporting surface 28. The surface 28 is contiguous to the track surface terminal portion 22 and inclined radially outwardly and downwardly relative to the central axis of the feeder bowl, as best shown in FIGS. 4 and 5. A coaxial annular groove 30 formed in the ring 26 opens upwardly through the article supporting surface 28, for a purpose which will be hereinafter further discussed. The lower portion of the ring 26 is partially defined by a substantially radially disposed and downwardly facing lower surface 32 and a radially outwardly facing annular surface 34.

The ring 26 rests upon a series of angularly spaced support rollers 36, 36 and 36a which are journalled for rotation about horizontal axes and which engage the lower surface 32 and support the ring 26 for rotation about the vertical axis of the feeder bowl 18 and relative to the bowl. It is further supported by three equiangularly spaced support rollers 38, 38 journalled for rotation about vertical axes and engaged with the annular surface 34, as best shown in FIG. 5. The rollers 38, 38 retain the ring 26 for coaxial rotation about the axis of the feeder bowl. The roller 36a comprises a drive roller which frictionally engages the surface 32 to drive the ring 26. The roller 36a is driven through a belt and pulley mechanism by an independent drive motor 40. The latter motor and its associated drive mechanism rotates the ring 26 about its axis in a clockwise direction relative to the feeder bowl 18 as viewed from above and as shown in FIG. 3.

An annular baffle 42 is mounted in fixed position above and in generally coaxial alignment with the annular ring 26. Preferably, and as shown, the baffle 42 is generally cylindrical and has an inside diameter somewhat larger than the inside diameter of the ring 26. The baffle 42 is preferably cylindrical and spaced above an associated portion of the article supporting surface 28, a distance greater than the maximum cross-sectional dimension of the syringe body portion 12, but less than the minor dimension of the enlarged flange 14. A downwardly opening gate slot 44 formed in the baffle 42 opens through the lower edge of the baffle at a discharge region angularly spaced from the region of the track terminal portion 22. The upper edge of the gate slot 44 is spaced a sufficient distance above the article supporting surface 28 to allow the radially enlarged flange portion 14 of a syringe body to pass therethrough.

Figure 7:
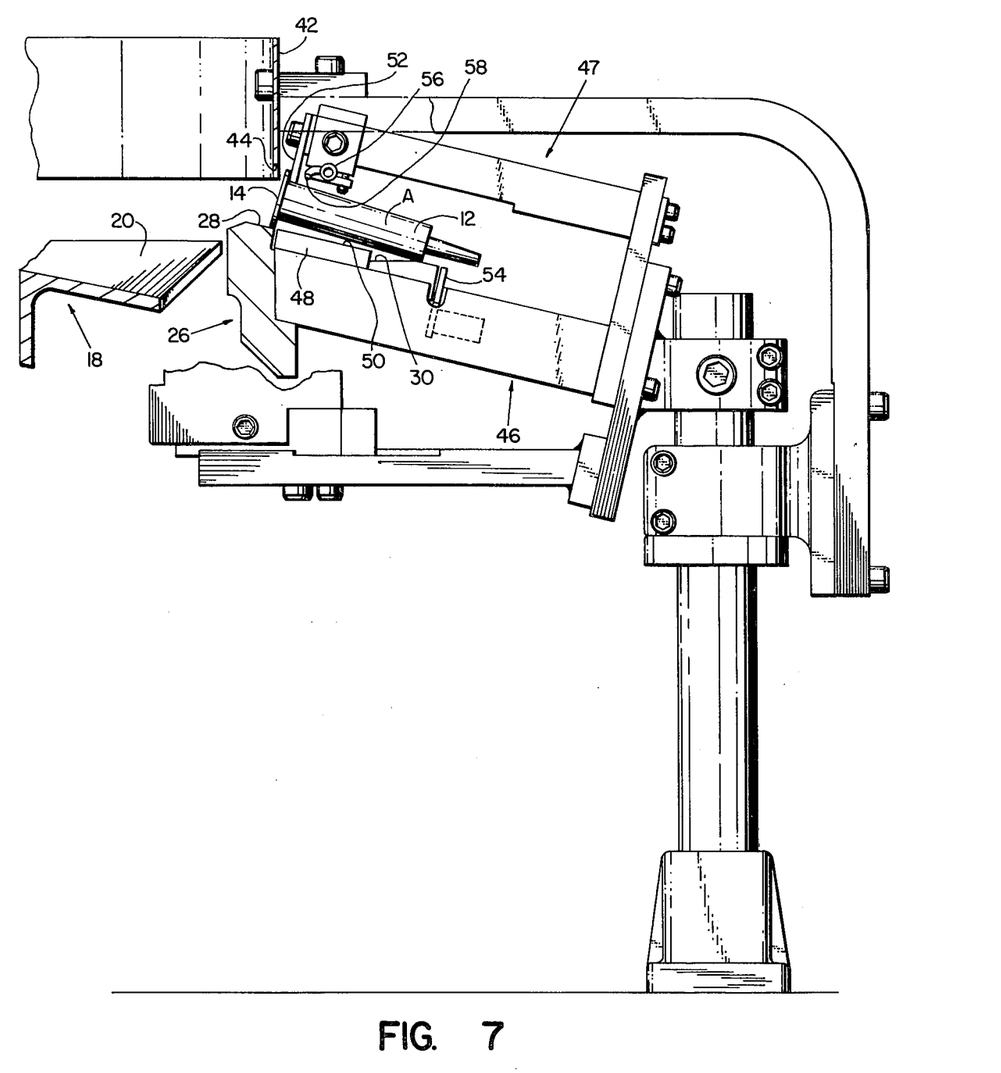
FIG. 7 is a somewhat enlarged fragmentary sectional view taken generally along the line 7—7 of FIG. 3.

A take-away conveyor, indicated generally at 46, which also comprises a part of the apparatus 10, is mounted in fixed position in the discharge region of the bowl 18 and extends in a generally tangential direction relative to the ring 26. The conveyor 46 has a frame assembly indicated generally at 47, which defines a guide track for receiving articles A, A from the article support surface 26 and guiding the articles in a generally tangential direction relative to the ring 26 to an exit or discharge point at one end of the frame. The frame 47 includes a tangentially extending guide plate 48 which has a generally upwardly facing guide surface 50. The entry end of the guide plate 48 extends into the annular groove 30, as best shown in FIGS. 3 and 7, and is arranged so that the surface 50 is substantially contiguous to the article supporting surface 28. As viewed in the direction of its exit end, and as shown in FIG. 7, the frame 47 and its associated guide plate 48 are inclined downwardly and generally radially outwardly relative to the central axis of the feeder bowl 18.

The conveyor 46 further includes a generally vertically disposed fence 52 supported above the guide plate 48 and in general parallel alignment with the inner edge of the plate. The fence is mounted on the frame 47 so that the lower edge of the fence is spaced above the guide plate surface 50 a distance greater than the maximum cross-sectional dimension of the syringe body portion 12, but less than the minor dimension of the syringe flange 14. A support rail 54 mounted on the frame 47 in parallel relation to the guide plate 48 has its entry end disposed generally tangentially of the ring 26. The upper edge of the support rail 54 and the surface 50 cooperate to support articles A, A as the articles move through the frame 47 which comprises the conveyor guide track. An air manifold 56, shown in FIG. 7, has a series of jet nozzles arranged at spaced intervals along the conveyor guide track and directed toward the exit end to move articles A, A through the conveyor 46. A typical nozzle is indicated at 58 in FIG. 7.

Preferably, the feeder bowl drive mechanism 25 is arranged to operate intermittently. The arrangement for controlling the feeder bowl drive mechanism may vary, however, the illustrated control mechanism indicated generally at 59 in FIG. 8, includes a timer 60 for activating and deactivating the drive mechanism 25 and a photoelectric sensing device 62 for controlling the timer as will be hereinafter further described. Another control mechanism, similar to the control mechanism illustrated in full lines in FIG. 8 is or may be provided to deactivate both the feeder bowl drive mechanism 25 and the ring drive unit 40, illustrated in broken lines in FIG. 8, in the event that an article becomes jammed in the machine 10, as will also be hereinafter further discussed.

Articles A, A fed from a supply hopper H (shown in FIG. 1) are deposited in the central portion of the feeder bowl 18. As hereinbefore explained, the feeder bowl is subjected to vibratory motion sufficient to move the syringe bodies or articles A, A placed therein in a path such that the articles A, A will travel upwardly along the ramp or track surface 20. As a syringe body or article A reaches the track terminal portion 22 it is free to move radially outwardly beyond the outer peripheral edge of the bowl 18 and onto the inner portion of the rotating annular article supporting surface 28. The spacing between the article supporting surface 28 and the lower edge of the baffle 42 is sufficient to allow the body portion 12 of the article A to pass therethrough. However, the baffle is positioned relative to the surface 28 so as to engage the enlarged annular flange portion 14 on each article A. Thus, the nozzle end of the article A will be thrown outwardly under and beyond the baffle 42 by centrifugal force causing the article to assume a position on the ring 26 wherein its longitudinal axis is generally radially aligned. The article A, which now rests on the upper or article supporting surface 28 of the ring 26, travels with the rotating ring to the gate slot 44. When the article reaches the gate slot 44 it is moved radially outwardly through the slot and generally onto the take-away conveyor 46 by centrifugal force. The spacing between the lower edge of the fence 52 and the guide plate surface 50 is sufficient to allow passage of the article body portion 12, however, the enlarged annular flange 14, which will not pass through this space, is engaged by the inner surface of the fence 52. An outer marginal portion of the annular article supporting surface 28 remains in engagement with the article body portion 12 after the article A is received within the conveyor 46. Thus, rotational movement of the ring 26 imparts the initial motion to the article A required to move it into the conveyor and toward the conveyor exit end. Air from the jet nozzles 58, 58 associated with the conveyor 46 impinges upon the article A to further move it through the conveyor.

The control mechanism 59 which includes the timer 60 and the photoelectric sensing device 62 provides a means for monitoring article movement and for disabling the feeder bowl drive mechanism 25 upon detection of a predetermined condition of article movement, as, for example, a slowdown of article movement below a predetermined rate of movement. The conveyor 46 preferably delivers articles A, A to another conveyor, such as the belt conveyor indicated at 64 in FIG. 3 which, in turn, delivers the articles to another machine, such as an assembly machine. Preferably, and as shown, the control mechanism 59 is associated with the belt conveyor 64 and is located some distance downstream of the conveyor 46. Movement of an article A into the path of the photoelectric sensing device 62 causes the sensing device to emit a high output signal which activates the timer 60. The timer functions as a timing switch to turn off the feeder bowl drive mechanism upon conclusion of a predetermined timing cycle. When the article A passes the sensing device 62, the device emits a low output signal which resets the time. If the article moves past the photoelectric sensing device 62 within the predetermined period for which the timer is set the timer will be reset before it can cycle to shutdown the feeder bowl drive mechanism 25. However, if an article A stalls in the path of the sensing device 62 for a time longer than the predetermined time for which the timer is set, the timer 60 will cycle to interrupt power to the feeder bowl drive mechanism 25. Power will be restored to the drive mechanism 25 when the stalled article moves beyond the sensing region of the photoelectric sensing device 62. Thus, the feeder bowl drive mechanism 25 operates continuously for as long as articles continue to move at a rate equal to or greater than a predetermined rate, as, for example, 1,000 articles per minute. However, when a backup of articles occurs on the conveyor 64 the vibratory feeding mechanism 25 is shutdown. Those articles which may already be in position on the ring 26 when shutdown occurs will continue to be urged toward and onto the guide conveyor 46 by the rotating ring and through the conveyor 46 and onto the conveyor 64 by air jets from the nozzles 58, 58. The drive mechanism 25 will be reenergized when the stalled articles again begin to move and will remain in operation for as long as the articles continue to move at a rate equal to or greater than the predetermined rate.

The mechanism for detecting an article jam in the machine 10 is substantially similar to the control mechanism 59, shown in FIG. 8, however, unlike the control mechanism 59 which shuts down only the feeder bowl drive 25 the jam control mechanism shuts down both the feeder bowl drive and the ring drive 40. The sensing device 62 which comprises a part of the jam control mechanism is preferably located in close proximity to the gate slot 44 at the entry end of the conveyor 46. If articles A, A fail to move onto and/or along the conveyor 46 at a rate equal to or greater than a predetermined rate, as determined by the setting of a timer 60, the jam control mechanism operates to shut down the entire machine 10.

We claim:

1. Apparatus for orienting and feeding articles, each of said articles having an axially elongated body portion and a radially enlarged portion axially spaced from at least one end of the body portion, said apparatus comprising a feeder bowl, having a vertical axis, for containing a supply of the articles and including a generally helical track surface extending along the inner periphery of said bowl which track surface has a terminal portion at the upper edge portion of said bowl which terminal portion has a radially outer arcuate edge free of any portion of said bowl extending upwardly therefrom and which terminal portion of said track surface extends generally inwardly and upwardly from said arcuate outer edge, feeder bowl drive means for vibrating said bowl to move articles onto said track surface and along said track surface in one direction of movement about said vertical bowl axis and in generally axial end-to-end relation to each other, said terminal portion of said track surface having a downstream end defining the limit of its extension in said one direction of movement about said vertical bowl axis, a ring concentric with said vertical bowl axis surrounding the upper edge portion of said bowl and having a generally upwardly facing annular article supporting surface with an inner circular edge closely adjacent to said outer arcuate edge of said terminal portion of said track surface, said annular article supporting surface of said ring being generally in line with said terminal portion of said bowl track surface, as seen on a vertical plane passing through said supporting surface and said terminal portion of said track surface and containing said vertical bowl axis, and extending generally outwardly and downwardly from its said inner circular edge to form essentially a generally radially outwardly extending continuation of said terminal portion of said bowl track surface for receiving articles after they move radially outwardly beyond said outer edge of said terminal portion, means supporting said ring for rotation about said vertical bowl axis relative to said bowl, ring drive means for rotating said ring independently of the vibratory movement of said bowl continuously in said one direction of movement about said vertical bowl axis, and a stationary arcuate baffle concentric with said vertical bowl axis extending circumferentially along the entire length of said terminal portion of said track surface and also extending for some distance beyond said downstream end of said terminal portion of said track surface in the direction of rotation of said ring, said baffle having a radius of curvature larger than the radius of curvature of said inner circular edge of said ring so as to be positioned radially outboard of said terminal portion of said track surface and above said supporting surface of said ring, said baffle further having a lower edge spaced above said supporting surface of said ring which lower edge because of the relative sizes of the radii of curvature of said baffle and said inner edge of said ring is located radially a substantial distance outwardly from said inner edge of said support surface of said ring so that a substantial portion of said supporting surface is located radially inside of said baffle and another substantial portion of said supporting surface is located radially outside of said baffle, the vertical spacing between said lower edge of said baffle and said supporting surface of said ring being such as to allow the body portion of each article to pass through the space so formed and to prevent passage of its enlarged portion, whereby after an article moves radially outwardly from said terminal portion of said bowl track surface to said supporting surface of said ring said article will be moved about said vertical axis by said ring and as a result will have centrifugal force applied thereto causing said body portion of the article to swing radially outwardly through the space between said lower edge of said baffle and said supporting surface while its radially enlarged portion is restrained against further radial outward movement by engagement with said baffle, said baffle being so radially spaced outwardly from said inner edge of said supporting surface of said ring and said ring extending a substantial distance radially outwardly beyond said baffle that after an article has its body portion swung radially outwardly through said space said portion of said supporting surface located radially inwardly of said baffle is of sufficient radial extent as to entirely receive said radially enlarged portion of said article and said body portion is underlaid by a portion of said ring located radially outwardly of said baffle whereby said article after its body portion has swung through said space is supported entirely by said ring at at least two points along its length on opposite sides of said baffle and is free of contact with said terminal portion of said bowl track surface, said baffle some distance circumferentially downstream beyond said downstream end of said terminal portion of said track surface having a discharge point at which said lower edge no longer restrains said enlarged portions of said articles so that said articles are free to move from said ring.

2. Apparatus for orienting and feeding articles as set forth in claim 1 wherein said baffle is an annular member extending fully around said vertical bowl axis.

3. Apparatus for orienting and feeding articles as set forth in claim 2 wherein said baffle has a gate slot in its lower edge portion which slot starts at said discharge point, said gate slot where it occurs providing said baffle with a lower edge spaced sufficiently above said supporting surface of said ring as to allow the radially enlarged portion of an article to pass radially beyond said baffle.

4. Apparatus for orienting and feeding articles, each of said articles having an axially elongated body portion and a radially enlarged portion axially spaced from at least one end of the body portion, said apparatus comprising a feeder bowl, having a vertical axis, for containing a supply of the articles and including a generally helical track surface extending along the inner periphery of said bowl which track surface has a terminal portion at the upper edge portion of said bowl which terminal portion has a radially outer arcuate edge and which terminal portion of said track surface extends generally inwardly and upwardly from said arcuate outer edge, feeder bowl drive means for vibrating said bowl to move articles onto said track surface and along said track surface in one direction of movement about said vertical bowl axis and in generally axial end-to-end relation to each other, said terminal portion of said track surface having a downstream end defining the limit of its extension in said one direction of movement about said vertical bowl axis, a ring concentric with said vertical bowl axis surrounding the upper edge portion of said bowl and having a generally upwardly facing annular article supporting surface with an inner circular edge closely adjacent to said outer arcuate edge of said terminal portion of said track surface, said annular article supporting surface of said ring being generally in line with said terminal portion of said bowl track surface, as seen on a vertical plane passing through said supporting surface and said terminal portion of said track surface and containing said vertical bowl axis, and extending generally outwardly and downwardly from its said inner circular edge to form essentially a continuation of said terminal portion of said bowl track surface for receiving articles after they move radially outwardly beyond said outer edge of said terminal portion, means supporting said ring for rotation about said vertical bowl axis relative to said bowl, ring drive means for rotating said ring independently of the vibratory movement of said bowl in said one direction of movement about said vertical bowl axis, a stationary arcuate baffle concentric with said vertical bowl axis extending circumferentially along said terminal portion of said track surface and also extending for some distance beyond said downstream end of said terminal portion of said track surface in the direction of rotation of said ring, said baffle having a lower edge spaced above said supporting surface of said ring and located radially a substantial distance outwardly from said inner edge of said support surface of said ring so that a substantial portion of said supporting surface is located radially inside of said baffle and another substantial portion of said supporting surface is located radially outside of said baffle, the vertical spacing between said lower edge of said baffle and said supporting surface of said ring being such as to allow the body portion of each article to pass through the space so formed and to prevent passage of its enlarged portion, whereby after an article moves radially outwardly from said terminal portion of said bowl track surface to said supporting surface of said ring said body portion of the article will swing radially outwardly through the space between said lower edge of said baffle and said supporting surface and its radially enlarged portion will be restrained against further radial outward movement by engagement with said baffle, said baffle being so radially spaced outwardly from said inner edge of said supporting surface of said ring that after an article has its body swung radially outwardly through said space said portion of said supporting surface located radially inwardly of said baffle is of sufficient radial extent as to entirely receive said radially enlarged portion of said article whereby said article after its body portion has swung through said space is supported entirely by said ring at at least two points along its length on opposite sides of said baffle and is free of contact with said terminal portion of said bowl track surface, said baffle some distance circumferentially downstream beyond said downstream end of said terminal portion of said track surface having a discharge point at which said lower edge no longer restrains said enlarged portions of said articles so that said articles are free to move from said ring, said ring having an annular groove in its said supporting surface, and a take-away means positioned adjacent said discharge point of said baffle for transporting said articles sidewise of themselves away from said discharge point in side-by-side orientation along a take-away path extending generally tangentially of said ring and with the axes of said articles as they move along at least the initial portion of said take-away path having substantially the same inclination to the horizontal as they do while supported by said ring just before reaching said discharge point, said take-away means including an elongated guide plate having an entry end portion located in said ring groove at said discharge point of said baffle, said guide plate extending away from said entry end portion tangentially of said groove to a point spaced outwardly beyond the outer edge of said ring, said guide plate having a generally upwardly facing support surface located below the body portions of articles which are brought to said entry end portion by said ring and which support surface subsequently vertically spports said articles as they move along said takeaway path away from said dischrage point.

5. Apparatus for orienting and feeding articles as defined in claim 4 further characterized by said take-away means also including an elongated fence member extending parallel to said guide plate, said fence member having a lower edge spaced above said support surface of said guide member by a distance sufficient to accommodate said body portions of said articles but less than sufficient to accommodate said radially enlarged portions of said articles whereby said fence member engages said radially enlarged portions of said articles to guide said articles along the length of said fence member.

6. Apparatus for orienting and feeding articles as defined in claim 5 further characterized by said fence member at said discharge point of said baffle being located closely adjacent to said baffle so that after the radially enlarged portion of an article is released by said baffle at said discharge point it immediately contacts said fence member which fence member thereafter restrains the article against movement axially of itself and guides it tangentially away from said ring.

7. Apparatus for orienting and feeding articles as defined in claim 6 further characterized by said take-away means also including means for emitting at least one air jet directed onto said articles in such a manner as to urge them along said take-away path.

8. Apparatus for orienting and feeding articles as set forth in claim 4 wherein said apparatus includes means for monitoring movement of articles through said take-away means, and means responsive to said monitoring means for disabling said feeder bowl drive means upon detection of a predetermined condition of article movement by said monitoring means.

9. Apparatus for orienting and feeding articles as set forth in claim 4 wherein said apparatus includes means for monitoring movement of articles moved by said apparatus, and means responsive to said monitoring means for disabling at least said feeder bowl drive means in response to a predetermined condition of article movement detected by said monitoring means.

10. Apparatus for orienting and feeding articles as set forth in claim 9 wherein said disabling means is further characterized as means for disabling both said feeder bowl drive means and said ring drive means.

11. Apparatus for orienting and feeding articles as set forth in claim 9 wherein said apparatus includes a take-away means for receiving articles released from said supporting surface of said ring at said discharge point of said baffle, and said monitoring means is positioned proximate said take-away means.

12. Apparatus for orienting and feeding articles as set forth in claim 9 wherein said apparatus includes a take-away means for receiving articles released from said supporting surface of said ring at said discharge point of said baffle, conveying means for receiving articles from said take-away means, and said monitoring means is associated with said conveying means.

* * * * *